Dec. 11, 1951     C. L. HINKSON     2,577,965
TROLLING SINKER
Filed June 26, 1948
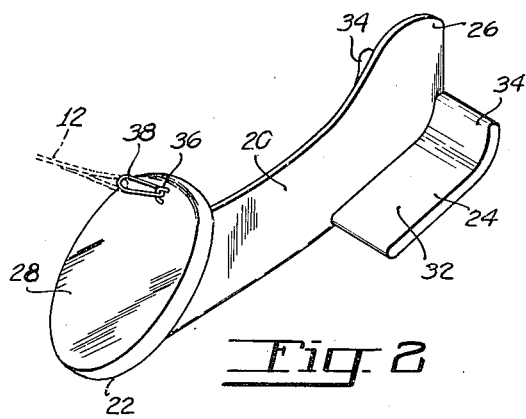
Fig. 2
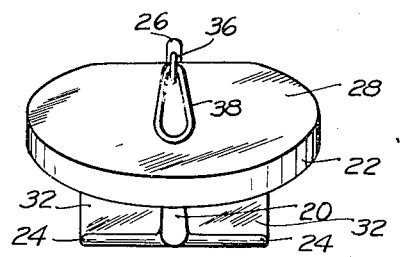
Fig. 4
Fig. 3
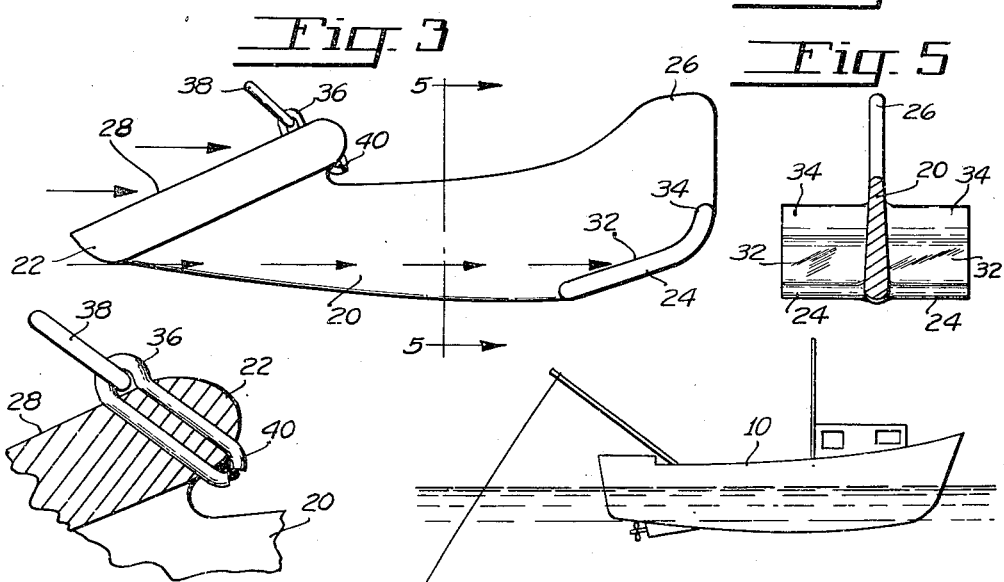
Fig. 5
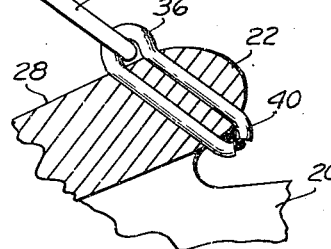
Fig. 6
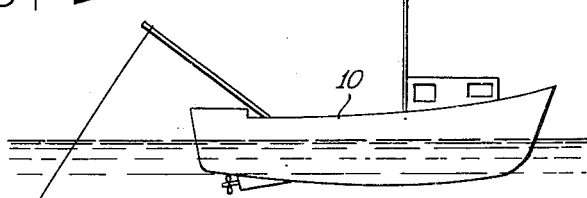
Fig. 1
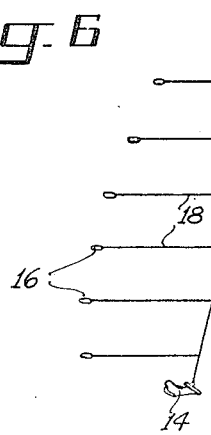
INVENTOR.
CLAIR L. HINKSON
BY
Reynolds & Beach
ATTORNEYS

UNITED STATES PATENT OFFICE 2,577,965

TROLLING SINKER

Clair L. Hinkson, Seattle, Wash., assignor to Hinkson Mfg. Co., Seattle, Wash., a partnership Application June 26, 1948, Serial No. 35,479

4 Claims. (Cl. 43—43.11)

This invention relates to a trolling sinker for fishing. Although such a sinker may have many uses, it is intended primarily, as herein illustrated, for employment in the method of commercial fishing wherein a weighted main, or ballast, line depending steeply from the fishing vessel carries at spaced lengthwise locations a number of leader, or branch, lines drawing individual lures at different levels of depth. This method is common with Pacific salmon fishermen and others. One of its main advantages lies in the comparatively large number of lines trolled conveniently from a single vessel without undue confusion or danger of entangling the lines.

Customarily, heavy round sinkers of the "cannon-ball" type have been employed to weight down the ballast line. These "cannon-ball" sinkers weighed frequently as much as forty pounds or more, and have become particularly expensive because of the increasing cost of lead. Moreover, because of their shape and weight distribution, they are frequently lost by snagging on the bottom during fishing. Being heavy and round, these sinkers were difficult to handle, particularly in keeping them from damaging the vessel in raising them over the side in a rough sea, and preventing them from rolling around on the deck and entangling fishing gear and doing other damage. During trolling with a "cannon-ball" sinker, any changes in speed of the vessel were reflected in corresponding changes in inclination of the ballast line, which had the undesired effect of changing depth and also the depth-wise spacing of the leader lines. Another characteristic of these sinkers was their tendency to rotate in the water, twisting the ballast line and entangling the leaders by wrapping them around it.

The general object of the present invention, therefore, is to devise an improved trolling sinker which circumvents or solves these difficulties. The invention contemplates a trolling sinker of special construction which will be propelled by hydrodynamic action to a depth in the water far greater than that obtainable under similar trolling conditions with a "cannon-ball" sinker of equal weight. The large resulting saving in metal required for the present type sinker, coupled with simplicity of structure, enables it to be manufactured at a cost substantially lower than the former type.

A particular purpose of the invention is to obtain a sinker whose weight distribution and shape make it extremely stable in its trolling attitude in the water, so that it will not rotate and twist the trolling line or tend to plunge, rise or veer from side to side unstably during trolling to tangle with other lines. Moreover, changes in speed of the vessel over a wide range will have substantially no undesired effect upon the elevation angle of the trolling line. As will be evident, the sinker, because of its shape and comparatively light weight, is easily handled without danger of damaging the vessel in lifting the sinker over the side of the vessel, or of rolling over the deck when laid there.

Viewed broadly, the invention comprises a trolling sinker comprising an elongated body portion terminating at its forward end in an enlarged head portion having a generally flat surface inclined relative to the body portion, and a stabilizing tail portion having stabilizing surfaces extending laterally from each side of the body portion, and an upright fin surface cooperable with the stabilizing surfaces. The laterally extending stabilizing surfaces are preferably inclined forwardly and downwardly, the rearward portions thereof curving upwardly and rearwardly rather abruptly to deflect water progressively upward and past the fin surface.

The particular details of form and construction of the illustrated sinker, including various other features, objects and advantages thereof, will become further evident from the following description based upon the accompanying drawings.

Figure 1 is a side elevation view of a fishing vessel engaged in trolling according to the commercial method herein described as a basis of illustrating the present invention, showing my improved trolling sinker at the end of the ballast line.

Figure 2 is a top isometric view of my improved trolling sinker; Figure 3 is a side elevation view of the sinker shown in trolling position; Figure 4 is a front elevation view of the same sinker.

Figure 5 is a transverse sectional view through the sinker on line 5—5 of Figure 3, and Figure 6 is a fragmentary view, partly in section, of a preferred type of sinker connector anchored to the head portion of the sinker.

As illustrated in Figure 1, fishing is done from the trolling vessel 10 by the use of a main or ballast line 12 depending steeply from the vessel, the angle of inclination in any given instance being determined by the speed of the vessel and the particular characteristics of the sinker 14 attached to the end of the ballast line. The fishing lures 16 are trolled at the trailing ends of a series of branch or leader lines 18 connected to the ballast line 12 at successive depth locations.

As shown clearly in Figures 2, 3 and 4, the trolling sinker comprises an elongated body portion 20, an enlarged head portion 22 generally in the shape of a disk set transversely of the body portion and inclined forward and downward relative to it, a stabilizing tail comprising stabilizing surfaces 24 in the form of plates projecting laterally from opposite sides of the body portion, and an upright fin plate 26. The enlarged head portion 22 has a substantially flat front face inclined forwardly and downwardly to constitute a diving control member. The elongated body portion 20 is preferably of plate form and disposed edgewise in a vertical plane, as shown best in Figures 3 and 5. Preferably the body tapers slightly in thickness from its forward end, adjoining the rear side of the generally disk-like head portion 22, toward its tail end, and from its lower edge toward its upper edge. The vertical width of the body progressively increases to some degree toward the tail.

The tail end of the body 20 merges with the fin plate 26, which latter may also taper in thickness heightwise. Preferably the composite body and fin section of the sinker has rounded upper and lower edges which streamline the sinker to lessen its resistance to movement through the water. While the particular outline shape of the composite body and the fin section in side elevation is not critical, the form illustrated is preferred. As shown, the rear edge of the fin constituting the trailing end of the sinker, terminates rather squarely (Figure 3). The upper edge of the body portion 20 preferably is formed as a reverse or ogee curve (cyma reversa) rising toward the tip of the fin along a moderate curve and then fairing into the fin tip in the reverse curve. The lower edge of the body portion in the vicinity of the tail curves generally upward to the rear, first along a rather constant slope and then more sharply to merge with the trailing terminal edge of the fin. For purposes of strength, the forward end of the body portion 20 fairs into the rear face of the transversely disposed head 22, forming reinforcing fillets at opposite sides of the body portion.

The lateral stabilizing tail surface plates 24 have generally flat forward portions 32 inclined forwardly and downwardly at an angle preferably slightly less than the inclination of the head's front face 28, and rearwardly and upwardly curved surface portions 34 continuing rearwardly from such forward portions. The forward edges of the stabilizing plates 24 are located rearward of the front end of the sinker about three-fourths of its total length. A 20 pound sinker of cast iron of this type has the front edges of its stabilizing plates eleven inches from its front end and its total length is fifteen inches. The bottoms of the stabilizing plates or blades 24 merge forwardly into the lower edge of the body and the rear edges of such plates are flush with the rear edge of the fin, as viewed in side elevation (Figure 3). Again, the best results have been obtained with tail surfaces formed in the illustrated manner, although slight variations would not render the sinker inoperative or unstable.

The relatively slightly inclined forward portion 32 of each stabilizing plate 24 is about two-thirds of the over-all length of such plate. As shown in Figure 3, when the sinker is in operative attitude, water in the free-stream passing beneath the lower edge of the head 22 first encounters the flat portions 32 of the fins 24, which deflect the water upwardly. The angle of deflection increases rapidly as the water encounters the upwardly curved rear stabilizing surface portions 34. The reaction of the water swept along the stabilizing surfaces, and deflected by them upwardly along the sides of the fin 26, holds the tail down, approximately as shown in Figure 3, in predetermined trolling attitude, and also stabilizes the sinker directionally. The action of the stabilizers in sweeping water rapidly over the upstanding fin, as well as the large broadside area of the thin body portion 20, effectively prevents side motion or darting of the sinker.

A preferred trolling line connector for the sinker comprises an eye 36 in the sinker's vertical longitudinal mid-plane, anchored in the upper rearward edge of the inclined head portion 22, and a ring 38 passed through the eye. The eye 36 is formed by a U-shaped piece of wire, the sides of which are inserted through parallel holes drilled through the projecting upper edge of the head 22 at the described location, and locked in place by bending over their rearwardly projecting ends and welding them together and tack-welding to the rear side of the head portion, as indicated at 40 (Figure 6). The connecting ring 38 is formed with a small radius of curvature where it passes through the eye, closely hugging the wire forming the eye. This snug fit of the ring with the eye tends to minify any tendency of the ring to slip too freely circumferentially through the eye, although it freely allows a change in angle of the plane of the ring with relation to the sinker axis as the inclination of the trolling line changes when the sinker is being lowered into the water. This slight degree of snugness of fit between the connector members seems to add somewhat to the stability of the sinker in the water and makes it somewhat easier to handle in air.

The preferred fore-and-aft weight distribution of the sinker locates its center of gravity at such a point that the face 28 assumes an angle of approximately ten degrees with the horizontal, when the sinker is suspended in mid-air by its connector ring 38. Under normal trolling conditions as the sinker first plunges to its operating depth the angle of the head is substantially greater. As the sinker approaches its leveling-off point this angle diminishes, becoming approximately 25 degrees, with the body portion approximately horizontal. Therefore, in trolling attitude the center of gravity of the sinker is located slightly behind a vertical line passed through the connector eye 36. It will also be evident that the principal mass of the sinker is largely in the disk-like head 22. The eye 36 is located rearwardly from the front end of the sinker approximately one-third of its length.

The combined effect of the sloping head and tail surfaces of the sinker cause it to dive through the water by planing action until it levels off stably at a certain depth determined by the weight and precise design of the sinker, the speed of the vessel and length of the trolling line. If this speed is increased, the tendency is for the sinker to plane even deeper in the water. While the increased speed also tends to sweep the sinker and trolling line further to the rear of the vessel, this effect is largely offset by the diving tendency. Consequently, the sinker tends to maintain the trolling line at a substantially constant inclination despite substantial variations in trolling speed of the vessel.

If the leading lower edge of the sinker's head should tend to catch on obstructions at the bottom during trolling, the sinker tilts up and forward by virtue of the moment created by the pull of the line about the caught lower edge. The tail of the sinker simply tilts forward far enough so that it slides over the obstruction. Such elevating of the tail structure precludes the stabilizers becoming caught on the same obstruction.

Comparative experiments with this sinker and the "cannon-ball" type sinker reveal that a given trolling depth may be obtained with a sinker of the present type which is approximately one-half the weight of a sinker of the "cannon-ball" type. A sinker of the disclosed type weighing approximately twenty pounds will perform the same line "weighting" operating as a "cannon-ball" sinker weighing substantially 40 pounds.

The sinker may be made of any heavy metal, cast iron being preferred because of its low cost, adaptability to casting and ruggedness. The cast iron sinker is galvanized or painted to prevent rusting.

I claim as my invention:

1. A ballast line trolling sinker comprising an elongated, thin and deep plate-like body, an enlarged disk-like head set transversely on the forward end of said body at a forward and downward incline relative to the general longitudinal axis of the body, a stabilizing tail having forwardly and downwardly inclined, similar stabilizing plates projecting laterally from opposite sides of the rear end of said body, and line connecting means on said sinker near the upper edge of the disk-like head, the stabilizing plates being joined to the rear end of the plate-like body at the latter's lower edge, said stabilizing plates having portions which are generally parallel to the disk-like head, and the stabilizing tail having an upward continuation of the plate-like body which extends between and above the stabilizing plates and constitutes a stabilizing fin, the laterally projecting stabilizing plates cooperating with said stabilizing fin to depress and stabilize the tail of the sinker during trolling.

2. The trolling sinker defined in claim 1, wherein the disk-like head is thicker than the plate-like body, and the line connecting means is located slightly ahead of the center of gravity of the sinker in its generally horizontal stabilized trolling attitude.

3. The trolling sinker defined in claim 2, wherein the inclination angle of the disk-like head is about twenty-five degrees, and the forwardly and downwardly inclination of the stabilizing plates substantially increases near their trailing edges.

4. The trolling sinker defined in claim 3, in which the stabilizing plates, stabilizing fin, plate-like body and disk-like head are of unitary cast-iron construction.

CLAIR L. HINKSON.

REFERENCES CITED

The following references are of record in the file of this patent:

UNITED STATES PATENTS

| Number | Name | Date |
|---|---|---|
| 1,202,631 | Winnie | Oct. 24, 1916 |
| 1,320,804 | Squarebriggs | Nov. 4, 1919 |
| 1,701,444 | Darr | Feb. 5, 1929 |
| 1,801,940 | Stanley | Apr. 21, 1931 |
| 2,115,302 | Chochard | Apr. 26, 1938 |
| 2,115,375 | Warner | Apr. 26, 1938 |